United States Patent [19]
Alanara et al.

[11] Patent Number: 6,067,460
[45] Date of Patent: May 23, 2000

[54] MOBILE STATION HAVING ENHANCED STANDBY MODE

[75] Inventors: Seppo Alanara, Oulu; Jukka Ranta, Salo; Hannu Pirila, Littoinen; Harri Jokinen, Hiisi, all of Finland

[73] Assignee: Nokia Mobile Phones Limited, Espoo, Finland

[21] Appl. No.: 08/835,240

[22] Filed: Apr. 7, 1997

Related U.S. Application Data

[63] Continuation-in-part of application No. 08/652,747, May 23, 1996, abandoned.

[51] Int. Cl.$^7$ .............................. H04B 1/38; H04B 1/18; H04B 1/16; H04Q 7/20
[52] U.S. Cl. .......................... 455/574; 455/434; 455/456; 455/161.3; 455/343
[58] Field of Search .................................. 455/574, 450, 455/161.3, 343, 422, 483, 434, 441, 444

[56] References Cited

U.S. PATENT DOCUMENTS

| | | | |
|---|---|---|---|
| 3,913,017 | 10/1975 | Imaseki | 455/434 |
| 4,777,655 | 10/1988 | Numata et al. | 455/76 |
| 4,860,005 | 8/1989 | DeLuca et al. | 340/825.4 |
| 4,903,319 | 2/1990 | Kasai et al. | 455/33 |
| 5,027,428 | 6/1991 | Ishiguro et al. | 455/67 |
| 5,031,231 | 7/1991 | Miyazaki | 455/54 |
| 5,148,153 | 9/1992 | Haymond | 340/711 |
| 5,239,667 | 8/1993 | Kanai | 455/441 |
| 5,265,270 | 11/1993 | Stengel et al. | 455/343 |
| 5,291,542 | 3/1994 | Kivari et al. | 379/58 |
| 5,293,639 | 3/1994 | Wilson et al. | 455/17 |
| 5,295,180 | 3/1994 | Vendetti et al. | 455/456 |
| 5,375,254 | 12/1994 | Owen | 455/432 |
| 5,378,935 | 1/1995 | Korhonen et al. | 327/114 |
| 5,396,645 | 3/1995 | Huff | 455/441 |
| 5,416,435 | 5/1995 | Jokinen et al. | 327/113 |
| 5,471,655 | 11/1995 | Kivari | 455/127 |
| 5,491,486 | 2/1996 | Welles, II et al. | 342/357 |
| 5,491,834 | 2/1996 | Chia | 455/441 |
| 5,548,806 | 8/1996 | Yamacochi et al. | 455/441 |
| 5,570,369 | 10/1996 | Jokinen | 370/95.3 |
| 5,574,996 | 11/1996 | Raith | 455/334 |
| 5,581,244 | 12/1996 | Jokimies et al. | 340/825.44 |
| 5,613,235 | 3/1997 | Kivari et al. | 455/343 |

FOREIGN PATENT DOCUMENTS

| | | |
|---|---|---|
| 0 833 537 A2 | 4/1998 | European Pat. Off. . |
| 2 305 825 | 4/1997 | United Kingdom . |
| WO92/01950 | 2/1992 | WIPO . |
| WO95/12932 | 5/1995 | WIPO . |

*Primary Examiner*—William G. Trost
*Assistant Examiner*—Tracy M. Legree
*Attorney, Agent, or Firm*—Ohlandt, Greeley, Ruggiero & Perle, L.L.P.

[57] ABSTRACT

When a mobile station (10) is in a DCCH camping state it monitors its assigned page frame. After making RSSI and possibly also Bit Error Rate/Word Error Rate (BER/WER) measurements the mobile station monitors the rate of change of the RSSI. If the rate of change is small and remains so, the mobile station is assumed to be in a stationary state. After determining that it is stationary, the mobile station may give an audible alert and/or display a message to request the user to confirm that the mobile station is (and will remain) stationary. When in the stationary state the mobile station inhibits making neighbor channel measurements for DCCH reselection. The mobile station continues to monitor its assigned page frame within an assigned digital control channel and to measure its own channel RSSI and possibly also the BER/WER. If these values subsequently indicate that the mobile station is no longer stationary, the mobile station immediately resumes all neighbor channel measurements.

14 Claims, 3 Drawing Sheets

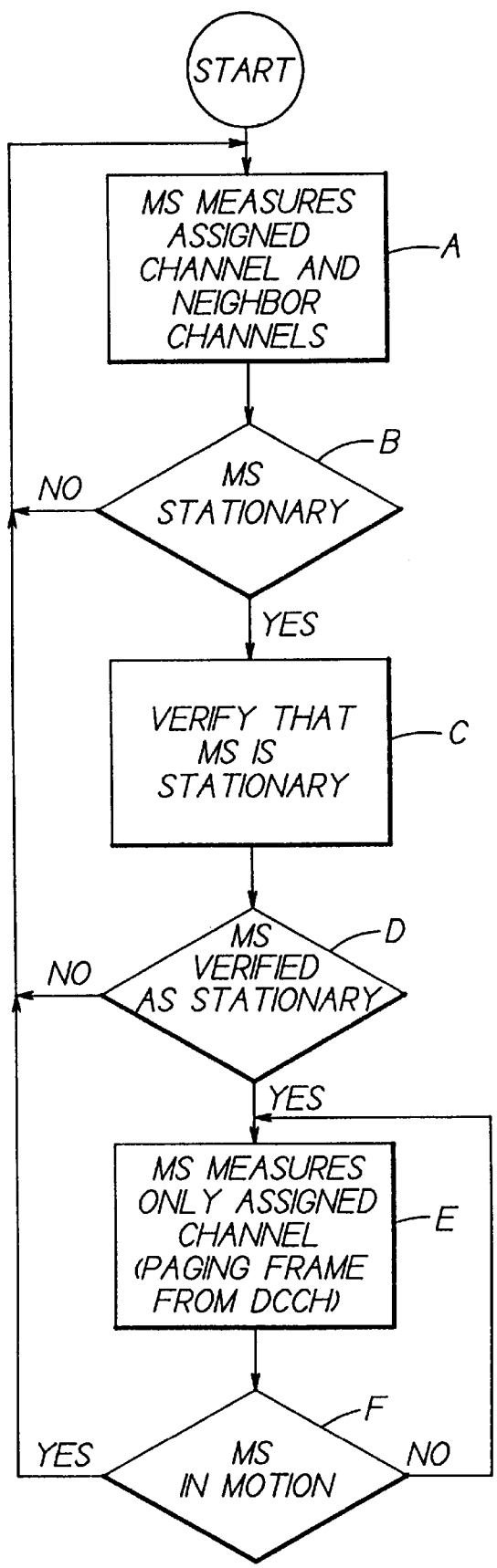

MOBILE STATION HAVING ENHANCED STANDBY MODE

CROSS-REFERENCE TO A RELATED PATENT APPLICATION

This patent application is a continuation-in-part of U.S. patent application Ser. No. 08/652,747, filed May, 23, 1996, entitled "Mobile Station Having Enhanced Standby Mode", by Seppo M. Alanara (abandoned).

FIELD OF THE INVENTION

This invention relates generally to radiotelephones and, in particular, to mobile transceivers, also referred to as mobile stations, such as those capable of operation with a cellular network.

BACKGROUND OF THE INVENTION

The current consumption of a mobile station when operating in an idle mode has a static component and a dynamic component. The static power consumption mainly results from the operation of the display, the crystal oscillator, a quiescent current consumed by voltage regulators, etc. The dynamic power consumption is, on the other hand, caused by the reception of messages, the transmission of messages, and the required signal processing (both analog and digital) relating to these tasks. A major portion of the dynamic power consumption is caused by the operation of the receiver and related circuitry during the reception of messages from a serving cell, and by neighbor cell monitoring used mainly for cell reselection purposes.

When a mobile station is powered on, and ready to receive or originate a call, the phone can be considered to be in a standby mode of operation. In this mode the mobile station will typically monitor a paging channel to detect the occurrence of an incoming call. For a battery powered mobile station it is important that the power consumption be minimized when in the standby mode in order to reduce battery drain. Preferably, one or more power saving techniques are employed, such as placing the mobile station's circuitry into a low power or quiescent mode, and only periodically reactivating the circuitry in order to receive and check the paging channel for an incoming call.

The following U.S. Patents are representative of various power saving techniques: U.S. Pat. No. 4,777,655, entitled "Control Signal Receiving System", by Numata et al.; U.S. Pat. No. 4,903,319, entitled "Portable Radio Telephone Having Power Saver", by Kasai et al.; U.S. Pat. No. 5,027,428, entitled "Power Saving Arrangement and Power Saving Method", by Ishiguro et al.; U.S. Pat. No. 5,031,231, entitled "Mobile Telephone Station with Power Saving Circuit", by Miyazaki; U.S. Pat. No. 5,265,270, entitled "Method and Apparatus for Providing Power Conservation in a Communication System, by Stengel et al.; and U.S. Pat. No. 5,293,693, entitled "Reduction of Power Consumption in a Portable Communication System". Reference in this regard can also be had to commonly assigned U.S. Pat. No. 5,471,655, entitled "Method and Apparatus for Operating a Radiotelephone in an Extended Stand-by Mode of Operation for Conserving Battery Power", by Raimo Kivari.

In one mobile station air interface standard that employs a Digital Control Channel (DCCH), known as IS-136.1, Rev. A, neighbor channel signal measurements for a DCCH reselection procedure consume much of the mobile station standby power. If the necessity to perform the neighbor channel measurements were eliminated the standby time could be increased. However, as currently specified the standard has a mandatory set of rules for neighbor channel measurements. These rules have been designed so as to maintain the mobile station tuned to a best available DCCH channel.

The IS-136 standard permits the mobile station to double the measurement period for any neighbor channel if, after several minutes, the channel is found to be stable (i.e., the rate of change of signal strength of the measured channel is found to be below some threshold value). The serving DCCH channel, however, is required to be measured at given, fixed intervals.

More particularly, and as is specified in IS-136.1, Rev. A, Mar. 21, 1996, Section 6.3.3.1, several information elements are included in the control channel Selection Parameters message sent on a Fast Broadcast Control Channel (F-BCCH), in a Neighbor Cell message, and in a Neighbor Cell (Multi Hyperband) message sent on an Extended Broadcast Control Channel (E-BCCH). These information elements are used in determining the interval of signal strength measurements (measurement interval) for the serving DCCH, for the Neighbor List (NL) entries, for Private Operating Frequencies (POFs, see Section 6.3.21), and for any DCCH identified as a result of a Non-Public Mode Search (see Section 6.3.19), as follows.

SCANINTERVAL: This information element represents the basic measurement interval in Hyperframes that is to be used for each frequency identified as requiring signal strength measurements. A Hyperframe consists of two Superframes, and has a total duration of 1.28 seconds.

HL-FREQ: There is one instance of this information element for each entry in the NL. HL-Freq is used to modify the SCANINTERVAL for each entry in the NL as follows. If HL-FREQ is equal to HIGH, the measurement-interval for the associated NL entry is given by SCANINTERVAL. If HL-FREQ is equal to LOW, the measurement interval for the associated NL entry is twice SCANINTERVAL. However, a mobile station may choose to measure all frequencies as if they have HL-FREQ set to HIGH.

Whenever there is a change in either the SCANINTERVAL or the NL contents, the mobile station computes a measurement interval for each entry in the NL. The measurement interval for the serving DCCH, for the Private Operating Frequencies (POFs), and for any DCCH identified as a result of a Non-Public Mode Search (NPS-DCCH), are always set to SCANINTERVAL. A mobile station's current Paging Frame Class (PFC) does not influence the computation of the measurement interval.

The mobile station measures the signal strength of the serving DCCH, POFs, NPS-DCCH and all viable NL entries each time their associated measurement interval lapses, and process the results according to a Reselection Criteria procedure (see Section 6.3.3.4). A given NL entry is considered viable if it is in a Hyperband supported by the mobile station; if it has a Network Type supported by the mobile station; or if it uses a form of modulation supported by the mobile station (i.e., FSK, and/or $\pi/4$-DQPSK).

As an example, for the case where SCANINTERVAL=0 and the NL contains eight entries having HL-FREQ=1, and eight entries having HL-FREQ=0, the following would result. For the serving DCCH, the measurement interval is equal to the period of one Hyperframe (i.e., 1.28 seconds). For NL entries having HL-FREQ=1, the measurement interval is also equal to one Hyperframe. For NL entries having HL-FREQ=0, the measurement interval is equal to two Hyperframes, or 2.56 seconds. The total number of signal strength measurements made per Hyperframe is thus (1+8+8)/2=13 (including the serving DCCH).

As is indicated in Section 6.3.3.2, if the value of a Scanning Option Indicator information element sent in a Control Channel Selection Parameters message is set to zero, the mobile station is not permitted to support any optional enhancements to the measurement interval. If the value of the Scanning Option Indicator information element is set to a one, the mobile station has the option of increasing the measurement interval (see Section 6.3.3.1) for one or more of the NL entries. There are three conditions that a mobile station can detect and respond to by increasing the measurement interval. A mobile station may increase the measurement interval, for any given NL entry, multiple times should more than one of these conditions be coincidental. The three conditions that may result in a mobile station increasing the measurement interval for one or more NL entries are as follows.

First, if the time since the last control channel reselection is greater than one hour, then the mobile station is allowed to increase the measurement interval for all NL entries by a factor of two.

Second, the mobile station must first make 25 signal strength measurements on the serving DCCH and NL entries in order to produce a valid processed signal strength (PSS) value. The algorithms used to produce PSS values are specified to consist of either a linear average (current measurement value plus 24 previous measurement values divided by 25), or of an exponential average ((current meas./25)+previous PSS*24/25). If the change in PSS on the serving DCCH is less than 7 dB over the last five minutes, and if the change in the PSS on all NL entries is less than 7 dB over the last five minutes, a mobile station is allowed to increase the measurement interval for all NL entries by a factor of two.

Third, if the difference between the PSS on the serving DCCH and the PSS for a NL entry is less than 10 dB over the last five minutes, a mobile station is allowed to increase the measurement interval for that NL entry by a factor of two.

As soon as a condition is no longer valid, the mobile station revokes the corresponding increase in measurement interval for all affected NL entries.

As is specified in Section 6.3.3.3, the mobile station must keep a running average of the last five signal strength measurements of the current DCCH (Long_RSS) for each measured frequency. Additionally, the mobile station must keep a running average of the last two signal strength measurements of the current DCCH (Short_RSS). Both of these values are then used for the control channel reselection procedure (see Section 6.3.3.4). The interval of signal strength measurements for any given frequency is determined by the value of the measurement interval, as was explained above in the discussion of Sections 6.3.3.1 and 6.3.3.2.

After the mobile station camps on a control channel a Full_reselect_data_indicator is reset. After collecting five signal strength measurements for each viable Neighbor List entry, the Full_reselect_data_indicator is set to show that valid average Long_RSS values are available, and that Neighbor List control channels can be considered for reselection purposes.

Reference may also be had to Sections 6.3.3.4 (Reselection Criteria), 6.3.3.4.1 (Reselection Trigger Conditions (RTC)), and 6.3.3.4.2 (Candidate Eligibility Filtering (CEF)).

As should be apparent from the foregoing discussion of one exemplary air interface standard, a mobile station can reduce but not eliminate the requirement to make signal strength measurements of channels besides the serving DCCH. As such, and although a reduction in battery power consumption can be realized, the reduction is not sufficient to maximize the amount of standby time that can be achieved before the mobile station's battery must be recharged.

Although the foregoing discussion has been presented in the context of an IS-136 based system, similar problems are present in other air interfaces. By example, in the GSM system neighbor cell monitoring involves making received signal strength (RSSI) measurements, performing Base Station Identity Code (BSIC) monitoring of the "best" neighboring cells (e.g., the six best neighbor cells), and receiving those BCCH parameters which control cell reselection. Before monitoring the BSIC of the neighbor cell a synchronization must be reached with the cell by the FCCH. Although neighbor cell monitoring can be affected by the parameters sent by the network, the neighbor cell monitoring is usually designed so as to be performed even in small cells and when the velocity of mobile station is high. In many situations, however, the mobile station is not moving, or is moving relatively slowly with respect to the neighboring cells.

In this regard it is noted that the reception operations of the mobile station may be divided in two categories: serving cell operations and adjacent cell operations.

The serving cell operations include the paging channel (PCH) reception, the broadcast control channel (BCCH) reception, and the cell broadcast channel (CBCH) reception, none of which can avoided.

The adjacent cell operations include neighbor cell synchronization channel (SCH) reception, neighbor cell system parameter acquisition from the neighbor cell BCCH, and the RSSI measurement of the neighboring cells. However, the sole purpose of these operations is to support the cell reselection procedures, which are required, typically, only when the mobile station is moving.

OBJECTS OF THE INVENTION

It is thus a first object of this invention to provide an improved method for operating a mobile station in a standby mode.

It is a second object of this invention to provide a method to eliminate or reduce, when one or more specified criteria are met, a requirement to receive signals from neighboring cells used for a cell reselection process.

It is a further object of this invention to provide a mobile station that operates so as to fulfil the first and second objects of this invention.

SUMMARY OF THE INVENTION

The foregoing and other problems are overcome and the objects of the invention are realized by methods and apparatus in accordance with embodiments of this invention.

The inventors have realized that when the mobile station is stationary, that is, when the mobile station's location is fixed or changing only slightly with respect to the cell of the serving DCCH and with respect to the neighboring cells, there is no added value in continuing to make measurements of channels other than the serving DCCH. If the mobile station can reliably determine that it is in a stationary state, the neighbor channel measurements do not serve any purpose since the mobile station may just remain on the serving DCCH until it determines that it is no longer stationary.

More particularly, and for an exemplary IS-136 embodiment, when the mobile station is in a DCCH camping state it monitors its assigned page frame from an assigned digital control channel. After making RSSI and possibly also Bit Error Rate/Word Error Rate (BER/WER) measurements the mobile station monitors the rate of change of the RSSI. If the rate of change is small and remains so, the mobile station is assumed to be in a stationary state (e.g., in a desktop adapter or lying on a table). After determining that it is stationary, the mobile station may give an audible alert and/or display a message to request the user to confirm that the mobile station is (and will remain) stationary. When in the stationary state the mobile station inhibits making neighbor channel measurements for DCCH reselection. The mobile station continues to monitor its assigned page frame from a currently assigned DCCH and to measure its own channel RSSI and possibly also the BER/WER. If one or more of these values subsequently indicate that the mobile station is no longer stationary, the mobile station immediately resumes all neighbor channel measurements.

This invention thus teaches a method for decreasing the standby power consumption in a mobile station by suspending or minimizing neighbor channel measurements, which are used for selecting the best possible DCCH, while the mobile station is in a stationary state. The method includes the steps of monitoring the rate of change of at least a received signal strength indicator (RSSI) for the mobile station's assigned DCCH, while continuing to make neighbor channel measurements. If the rate of change of the RSSI is below and remains below some predetermined threshold, the mobile station declares itself to be stationary. An optional step verifies that the mobile station is stationary, such as by prompting the user to verify that the mobile station is stationary, and/or with information received from the serving base station, and/or with information received from an internal motion sensor, such as an accelerometer. The neighbor channel measurements are suspended so long as the rate of change of the RSSI in the mobile station's assigned DCCH is below the predetermined threshold. Once the rate of change increases above the threshold value, the mobile station declares itself to be in motion, and resumes neighbor channel measurements so as to enable the DCCH reselection procedure to be subsequently performed.

This invention further teaches methods for reducing or eliminating a requirement to operate the mobile station's receiver to perform cell reselection operations when in the idle state. The methods are shown to be applicable to a number of different air interface standards, such as IS-136 and GSM.

BRIEF DESCRIPTION OF THE DRAWINGS

The above set forth and other features of the invention are made more apparent in the ensuing Detailed Description of the Invention when read in conjunction with the attached Drawings, wherein:

FIG. 4 is a logic flow diagram that illustrates a method of this invention.

DETAILED DESCRIPTION OF THE INVENTION

Figure 1:
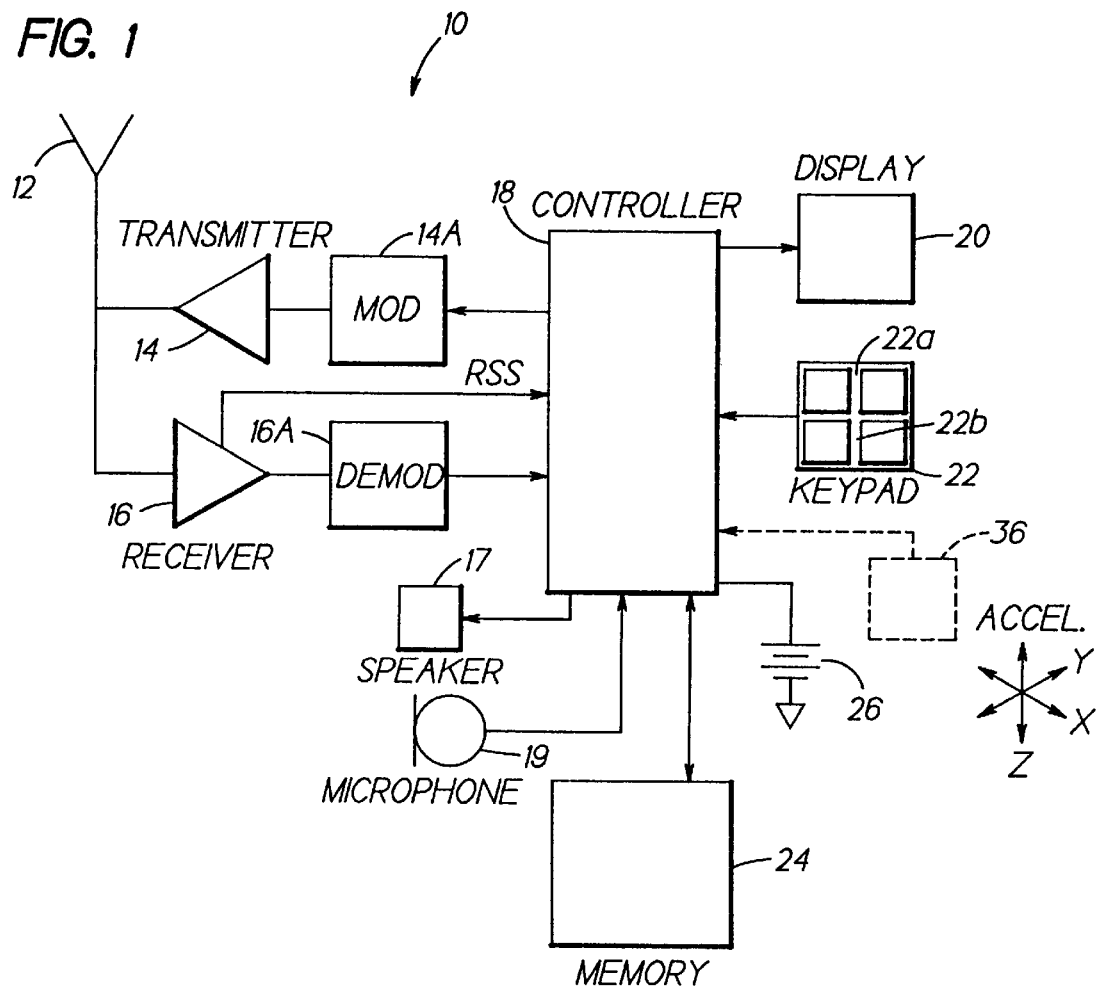
FIG. 1 is a block diagram of a mobile station that is constructed and operated in accordance with this invention.
Figure 2:
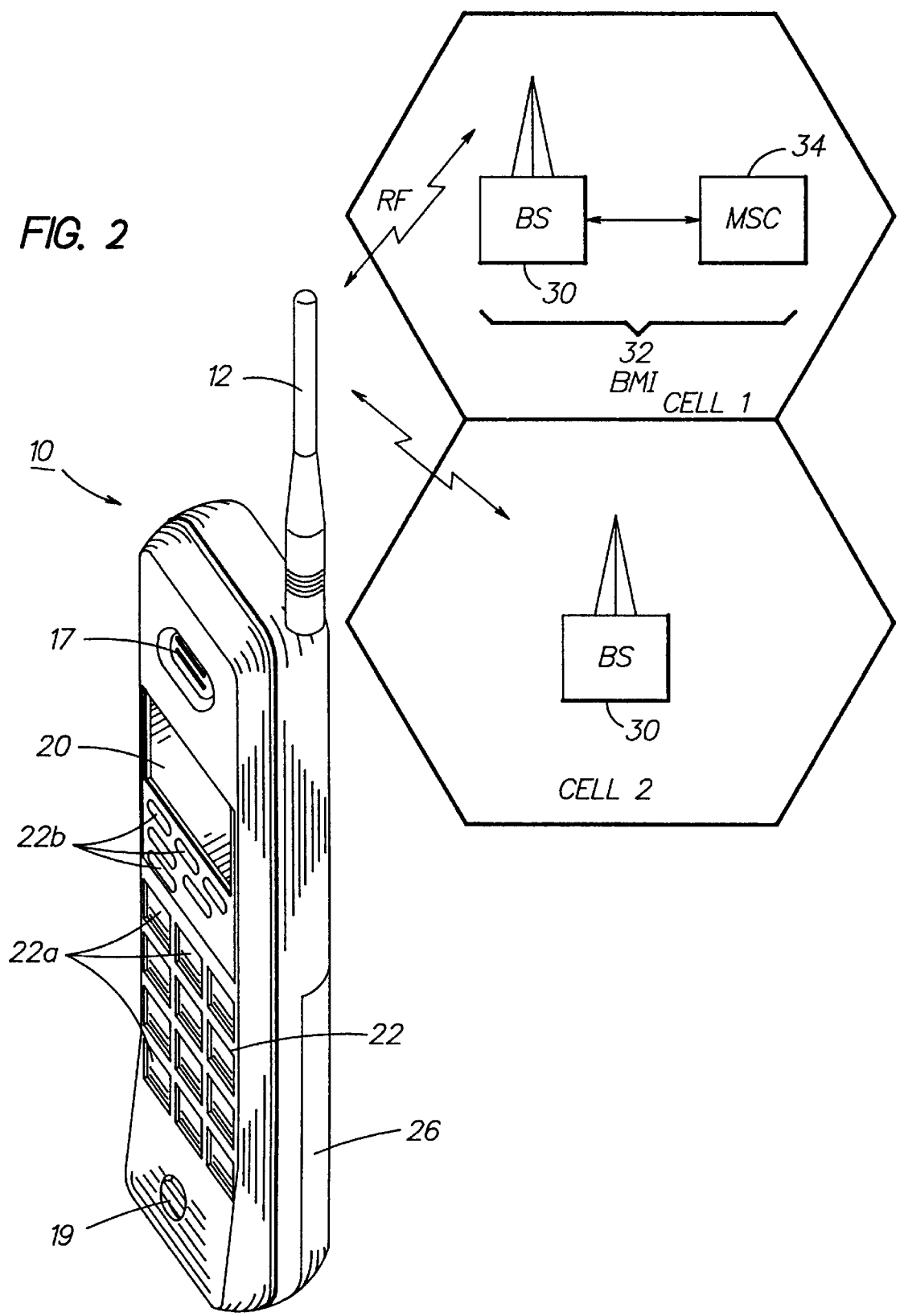
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising the BMI 32 that includes a Mobile Switching Center (MSC) 34. The MSC 34 provides a connection to landline trunks when the mobile station 10 is registered with the network. The base station 30 has a coverage area defining a cell (cell 1), that typically will be adjacent to at least one neighboring cell (cell 2) that is served by a second base station 30.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a Time Division Multiple Access (TDMA) digital control channel (DCCH) measurement and reselection capability of a type that was described above. However, the teaching of this invention is not intended to be limited only to this specific type of channel organization, nor is the invention limited for use only with an IS-136 compatible mobile station, nor is this invention limited for use only in TDMA-type systems. As will be described below, the teachings of this invention apply as well to GSM and other types of cellular systems.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The mobile station 10 also includes a battery 26 for powering the various circuits that are required to operate the mobile station.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136 and GSM, such as IS-95 (CDMA). Narrow-band AMPS (NAMPS), as well as TACS, mobile stations may also benefit from the teaching of this invention. It should thus be clear that the teaching of this invention is not to be construed to be limited to any one particular type of mobile station or air interface standard.

The operating program in the memory 24 includes routines to present messages and message-related functions to the user on the display 20. The memory 24 also includes routines for implementing the method described below in relation to FIGS. 3 and 4.

Figure 3:
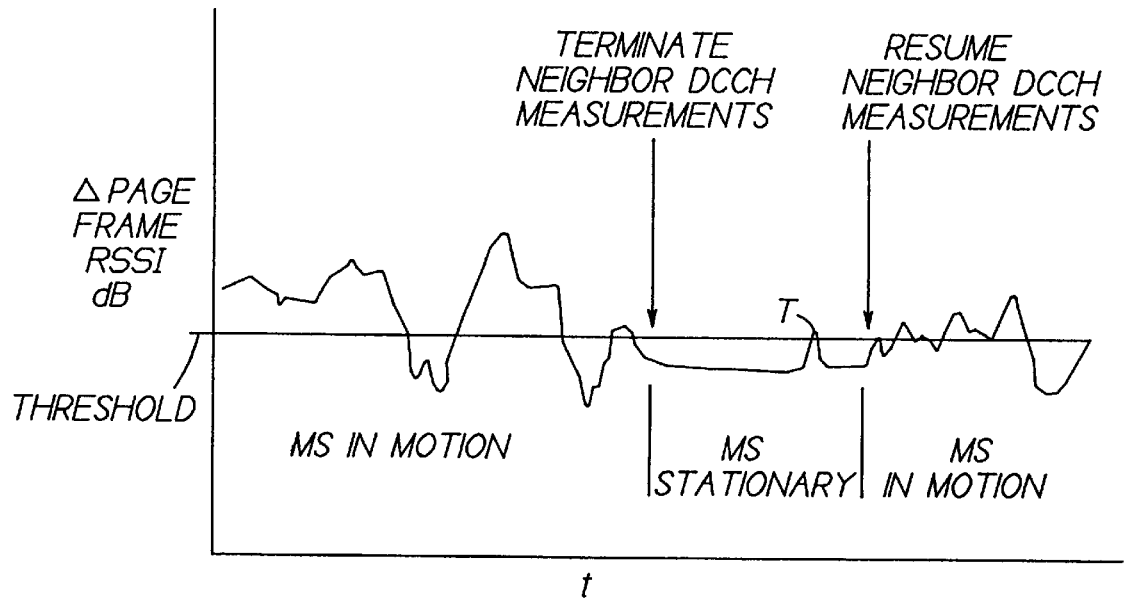
FIG. 3 is an exemplary graph of a change in page frame RSSI over time, and illustrates a period wherein the mobile station is stationary.

Reference is now made to FIGS. 3 and 4 for illustrating the operation of the mobile station 10 in accordance with an IS-136 embodiment of this invention. At Block A of FIG. 4 the mobile station 10 measures the assigned DCCH and neighboring channels based on a current measurement rate, and derives a linear or exponential average as defined in, by example, IS-136.1, Rev. A, Section 6.3.3.2. The mobile station 10 is typically assigned one paging frame per Superframe (0.64 seconds), with the paging frame being repeated in the secondary Superframe. One Hyperframe consists of two Superframes, and thus has a duration of 1.28 seconds. Typically the mobile station 10 receives only the first paging frame from the primary (first) Superframe, with the secondary Superframe being provided for redundancy. When in the standby mode the mobile station preferably, when not required to measure the assigned and neighboring channels, places itself into a low power mode of operation by selectively powering off or down the receiver 16 and other circuitry (such as the controller 18).

A change in the RSSI ($\Delta$ page frame RSSI) over time is illustrated in FIG. 3 for the case where the mobile station 10 is in motion, and for the case where the mobile station 10 is stationary. As can be seen, when the mobile station 10 is stationary the $\Delta$RSSI value will remain relatively constant (within some range of values) for some period of time, at or below a threshold value. The $\Delta$RSSI will vary over time when the mobile station 10 is in motion because of changes in propagation conditions due to fading, blockage, antenna orientation, etc. The RSSI can be determined from a received signal strength (RSS) signal obtained from the receiver 16 of FIG. 1, such as from the IF stage.

One suitable, but not limiting, technique for determining the value of $\Delta$RSSI is by subtracting the most recent RSSI reading from an average or weighted average of the RSSI.

At Block B the mobile station determines from the $\Delta$RSSI that the mobile station 10 is stationary. That is, the value of $\Delta$RSSI is found to remain relatively constant at or below some threshold value.

After some suitable period of time has elapsed (e.g., 60 seconds), wherein the value of $\Delta$RSSI remains relatively constant, the mobile station 10 verifies at optional Blocks C and D that the mobile station is indeed stationary. This can be achieved by generating an audible alert and thus prompting the user to depress a predetermined key or keys for indicating that the mobile station 10 is (and will remain) stationary. The display 20 can also be used to query the user as to whether the mobile station 10 is stationary.

Furthermore, and referring to FIG. 1, a suitable motion sensor, such as an acceleration transducer 36 having three sensitive axes, can be used for verifying that the mobile station 10 is not in motion. A three axes sensor is desirable in that the orientation of the mobile station 10 with respect to a motion vector may be random, and thus a one axis or two axes sensor may not sense the motion if the sensor is not properly aligned with the mobile station's motion vector. Suitable acceleration transducers are available in small packages, and may thus be readily integrated with the circuitry of the mobile station 10.

It is also within the scope of this invention to provide a signalling protocol for the base station 30 to inform the mobile station 10 that the mobile station's location has not changed within some period of time, with the base station 30 sending such a message to the mobile station 10 either autonomously or in response to a query from the mobile station 10. The base station 30 can determine if the mobile station 10 is in motion from variations in the received signal strength of the mobile station 10 at the base station 30, and/or by comparing a change in signal strength over time, both at the base station of the serving cell and that received by base stations of one or more neighboring cells. The base station 30 is also enabled to determine the position from mobile station transmissions during registrations.

After optional Block D, and assuming for this case that the mobile station 10 is verified to be stationary, the mobile station 10 terminates the measurements of neighboring channels, while continuing to periodically measure its own assigned channel. In this manner the power consumption of the mobile station is limited to only that required to measure the RSS and possibly also the BER/WER of its own paging frame. When not making the own channel measurements the mobile station 10 places itself into a low power consumption mode. In this manner the standby time is significantly increased over that obtainable in accordance with the prior art technique described previously.

At Block F the mobile station 10 continues to periodically monitor the value of $\Delta$RSSI to detect a value that exceeds the threshold. If the threshold value is exceeded, the mobile station 10 assumes that it is in motion and returns to Block A to measure its own paging frame and also neighboring channels as defined by stored NL entries, POFs, etc.

It should be noted that if the mobile station 10 is close to a private or residential cell it may not detect the cell because the public cell RSSI may remain stable as the mobile station 10 approaches the cell site. However, this will not be the case when the mobile station 10 is carried inside of a building, in that this would most probably change the RSSI of the serving DCCH channel.

This situation can also be avoided by the mobile station maintaining a historical RSSI record, and associating the presence of the public serving control channel to the proximity of a residential or a private cell. In this case the mobile station 10 may not terminate all neighbor channel measurements, but would instead continue to make measurements on the serving channel in addition to the channels of the probable residential/private operating frequencies.

It may also be the case that mobile station 10 is stationary (e.g., on a desktop) but some object in close proximity is moving and thus causing a variation in the $\Delta$RSSI, which variation may be erroneously interpreted as motion of the mobile station 10. Such motions of adjacent objects will, however, typically cause only momentary variations in the $\Delta$RSSI. As such, it is preferred at Block F to continue to monitor the $\Delta$RSSI even after it exceeds the threshold for some predetermined period to determine if the fluctuation in the value of $\Delta$RSSI is a transient condition, or is instead indicative of actual motion of the mobile station 10. One such transient (T) fluctuation in the own channel $\Delta$RSSI is illustrated in FIG. 3.

Although described in the context of preferred embodiments, it should be realized that a number of modifications to these teachings may occur to one skilled in the art. By example, the base station alone can be used to detect that the mobile station 10 has become stationary. After detecting this condition the base station 30 may signal the mobile station 10, which in turn may request the user to verify that the mobile station has become and will remain stationary. Alternately, the output of the motion sensor 36 alone can be used to detect that the mobile station 10 has become stationary, thereby causing the mobile station 10 to either prompt the user to verify this condition, or to terminate the neighbor channel measurements without user verification. The motion sensor 36 can also be used to determine that the mobile station 10 is no longer stationary, either alone or in combination with own channel $\Delta$RSSI measurements.

The above-mentioned BER/WER measurements can also be used either alone or in conjunction with the $\Delta$RSSI to detect the stationary/nonstationary conditions. By example, each of these measured values can be assigned a respective threshold, and two or more of the values (e.g., $\Delta$RSSI and $\Delta$BER) must be found to not exceed their respective thresholds in order to declare that the mobile station 10 is stationary at Blocks B and C. A suitable threshold value for the $\Delta$RSSI value may be a value in the range of about 7 dB to about 10 dB. This value can be made adaptive by the mobile station 10 (or the base station 30) to accommodate various channel conditions, such as the presence of interference.

It is also within the scope of this invention for the mobile station 10 to avail itself of other position determining aids, such as satellite-based global positioning systems (GPS) and the like. By example, the mobile station 10 may be constructed to include, or be interfaced to, a GPS receiver.

Having described an embodiment of this invention that was presented in the context of an IS-136 based system, a description will now be provided for a GSM embodiment. It should be understood that many of the concepts that are presented below apply as well to the IS-136 embodiment, as well as to other air interfaces.

Power conservation can be generally divided to three main parts, as described below.

Activation: Because the power saving mode results in a delayed cell selection, the activation and deactivation of the power save mode can be made by a user's command using the keypad 22 and display 20. The activation may have different levels (different modes) for reducing the power consumption. The user may be informed on the display 20 of a currently selected power save mode.

A "resetting" of the list of the neighbor cells: The neighbor cell monitoring can be disabled by, for example, effectively deleting the neighbor cell list stored in the memory 24. This can be accomplished by removing the list of neighbor cell frequencies which is received from the serving cell's base station 30. In this case the mobile station 10 functions automatically to assume that no neighbor cell monitoring is required.

Another option, to provide a slower cell reselection, is to eliminate only the RSSI measurements, but not the reception of BSICs (synchronization information of the neighbor cells is thus maintained). By using timing information received from BSIC monitoring, the status of the mobile station 10 (moving/not moving) can be determined and the activation/deactivation of the power save mode can be performed automatically. It should be noted that the mobile station 10 has knowledge of the timing of serving cell, as well as knowledge of the timing difference between the neighboring cells and the serving cell. When the mobile station 10 receives the BSICs from the neighboring cells (e.g. from the six best neighboring cells) it updates the stored timing information. When the mobile station 10 detects a change in the timing values (e.g., changes in mutual propagation delays of neighboring base stations) it can assume that the mobile station 10 is in motion, and that cell reselection procedures, in particular the RSSI measurements, should not be disabled. In this case the total power saving is smaller, yet still significant, as the RSSI measurements consume a considerable amount of battery power.

Automatic cell selection when required: Automatic cell reselection must still be done when needed. One suitable criterion is that if the averaged RSSI level received during BSIC monitoring exceeds the RSSI level of the mobile station's serving cell, then automatic cell reselection is activated. An estimate of the RSSI of neighbor cells can be obtained by averaging the RSSI during BSIC reception. It is noted that the BSIC monitoring does not need to be performed as often as neighboring cell RSSI measurements, leading to a reduction in power consumption. Automatic cell reselection may also be activated if there is a failure of downlink signalling in the serving cell, or if the status of the serving cell changes to "barred". Cell reselection can also be periodically activated by a timer 18a (FIG. 1) that is programmed by the controller 18.

In general, the activation and temporary disabling of neighbor cell monitoring can be readily accomplished. Automatic cell reselection has, on the other hand, many options. The preferred approach is a compromise between the power saving that is realized and the speed of cell reselection.

It is noted that when the need for cell reselection arises, the reselection can require more time than in a normal situation. Cell reselection requires that normal neighbor cell monitoring is first activated, and then the RSSI levels of the cells in the neighbor list must be measured. Also, synchronization must be achieved and the parameters needed for cell reselection must be received on the BCCH channel. However, if the BSIC monitoring remains active the cell reselection can typically be performed without the activation of the normal mode of neighbor cell monitoring.

The following techniques can be used alone or in combination to minimize the drawbacks of the delayed cell reselection. First, the power save mode may be activated only by a user's command. In this case the current mode (cell reselection active/inactive) of the mobile station 10 is preferably displayed to the user. Second, the normal neighbor cell monitoring can be activated after a cell reselection is performed (when a criterion or criteria for cell reselection have been fulfilled). In this case the power save mode is active until the mobile station 10 leaves the cell where the power save mode was activated. Third, the neighbor cell monitoring is periodically activated using the timer 18a. The time between activation periods is preferably sufficiently long so that a significant savings in power can be realized. Fourth, neighbor cell monitoring can be briefly activated when the RSSI level of the serving cell decreases by some predetermined amount. In this case the cell reselection can be underway before the serving cell is lost. Fifth, the neighbor cell monitoring can be active for a certain fixed time period after cell reselection. In this case the power saving mode does not become active if the need for cell reselection often occurs, such as when moving through small cells. Sixth, the power saving mode (neighbor cell monitoring disabled) may be automatically activated during a certain period of time, e.g., from 9:00 P.M. to 7.00 A.M., or any other selected time period when the probability is highest that the mobile station 10 will be stationary or nearly stationary. Seventh, the power save mode may be activated when the mobile station 10 is in the vicinity of a certain, predetermined cell (e.g., in a cell that serves an office or a residence), as identified by one or more predetermined cell identifiers that are stored in the memory 24, either automatically or by command of the user.

Further in accordance with this invention, the mobile station 10 has the following information that can be used for motion detection: the serving cell signal level of received bursts (RxLev), which is measured in any case, and adjacent cell signal levels (RSSI), which require separate receiver activity. In the idle mode these two items of information are updated every time a paging block is received.

In accordance with a further aspect of this invention, first denote the RxLev at time n by R(n), and denote the RSSI of adjacent cell i at time n by S(i,n). Next, define the motion indication at time n with delay k as:

$$M(n,k)=A_1 abs(f(R(n))-f(R(n-k)))+A_2 sum_i abs(f(S(i,n))-f(S(i,n-k))),$$

where $A_i$ and $B_i$ are weighting coefficients, 'abs' is the absolute value function, and $sum_i$ is the sum of the items over index i. Function f is a mapping function which causes the motion indication to be differently sensitive to different absolute signal levels.

Next define a combined delay motion indictor as:

$$C(n)=sum_i B_i M(n,i).$$

The function f and the coefficients $A_i$ and $B_i$ may be determined empirically by simulations and field tests. The number of non-zero values for $B_i$ may also be determined in the same manner.

When the mobile station 10 is moving the serving cell signal level and the adjacent cell signal levels constantly change due to fading of the signal. The faster the mobile station 10 moves the larger is the motion indicator C(n).

The following pseudo-code presents an example of a mobile station executed algorithm for providing a reduction in adjacent cell reselection operation, as well as a termination of the minimized cell reselection operating mode. The terminology used in the pseudo-code is related specifically to GSM, but those having skill in this art will recognize that the algorithm has broader applicability, and can be readily adapted for use in other cellular systems. Those having skill in the art may also recognize that certain of the steps may be interchanged and/or modified. Such changes and modifications are still encompassed by the teachings of this invention.

Algorithm: Automatic Adjacent Cell Reselection Reduction and Reestablishment
n=0;
stationary_time=0;
Set the number of RSSI measurements to AMOUNT(0);
Set the SCH refresh period to SCH_REFRESH_PERIOD (0);
Set the BCCH refresh period to BCCH_REFRESH_PERIOD(0);
Start adjacent cell SCH search task;
LOOP FOREVER
  Wait for and receive a paging block;
  Calculate C(n);
  IF C(n)>MOTION_THRESHOLD THEN
    Set the amount of RSSI measurements to AMOUNT (0);
    Set the SCH refresh period to SCH_REFRESH_PERIOD (0);
    Start adjacent cell SCH search task;
    stationary time=0;
  ELSE
    stationary_time=stationary_time+1;
  ENDIF
  IF stationary_time>SCH_SEARCH_TIMEOUT THEN
    Stop adjacent cell SCH searching task;
  FOR k=1 TO N_OF_STEPS DO
    IF stationary_time=MOTION_TIMEOUT(k) THEN
      Reduce the amount of RSSI measurements to RSSI_AMOUNT(k);
      Increase the SCH refresh period to SCH_REFRESH_PERIOD(k);
      Increase the BCCH refresh period to BCCH_REFRESH_PERIOD(k);
    ENDIF
  ENDFOR
  n=n+1;
ENDLOOP In the algorithm the amount of RSSI measurements means typically the number of adjacent cell signal level samples per one paging block reception. The adjacent cell SCH search task means the actions related to searching for the SCH blocks of those adjacent cells from which the SCH block has not been received. SCH and BCCH refreshing means the procedures to periodically receive SCH and BCCH blocks from those adjacent cells where these blocks have been earlier received.

The values of the constants RSSI_AMOUNT(i), SCH_REFRESH_PERIOD(i), BCCH_REFRESH_PERIOD(i), N_OF_STEPS, MOTION_THRESHOLD, and MOTION_TIMEOUT(i) are preferably defined empirically by simulations and field tests. The following rules are assumed to be valid in any case:
MOTION_TIMEOUT(i)>MOTION_TIMEOUT(i-1)
RSSI_AMOUNT(0) is the 'normal' value used during motion
SCH_REFRESH_PERIOD(0) is the 'normal' value used during motion
BCCH_REFRESH_PERIOD(0) is the 'normal' value used during motion
RSSI_AMOUNT(i)<RSSI_AMOUNT (i-1)
BCCH_REFRESH_PERIOD(i)>BCCH_REFRESH_PERIOD(i-1)

The use of the foregoing algorithm provides a number of advantages. A first advantage is the total amount of reception can be reduced by about 40%, when the mobile station 10 is stationary relative to the surrounding cells. A second advantage is that the battery life can be extended by about 20% to 35%, depending on the amount of motion of the mobile station 10. A third advantage is that the use of the algorithm does not require that any hardware modifications be made to the mobile station 10. The fourth advantage is that the use of the algorithm does not necessarily require any changes in the cellular system air interface standards.

Although the method has been described in the context of the GSM system, it can as well be applied to DCS1800 and DCS1900 without any modifications. Furthermore, and although the details of other systems such as IS-136, PDC, IS-54, IS-96, and UMTS differ slightly from the GSM embodiment described above, only minor modifications, if any, are required when using the algorithm in these systems.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless mobile station in a standby mode, comprising the steps of:
periodically making received signal strength measurements of a currently assigned digital control channel and at least one other currently non-assigned channel;

detecting that the mobile station has become stationary when a change over time in the received signal strength of the currently assigned digital control channel falls below a predetermined threshold;

verifying that the mobile station has become stationary;

terminating the measurements of the at least one other currently non-assigned channel;

detecting that the mobile station is no longer stationary when a change over time in the received signal strength of the currently assigned digital control channel rises above the predetermined threshold; and initiating the measurements of the at least one other currently non-assigned channel; wherein the step of terminating the measurements of the at least one other currently non-assigned channel is also executed upon an occurrence of a detection by the mobile station that a cell serving the mobile station is a predetermined cell.

2. A method as set forth in claim 1, wherein the step of verifying includes a step of prompting at least one of a user and a base station to verify that the mobile station has become stationary.

3. A method as set forth in claim 1, wherein at least the step of detecting that the mobile station has become stationary includes the steps of:

operating a motion sensor; and detecting that the mobile station has become stationary based at least in part on an output of the motion sensor.

4. A method as set forth in claim 1, wherein at least the step of detecting that the mobile station has become stationary includes the steps of:

operating a multi-axis acceleration transducer; and detecting that the mobile station has become stationary based at least in part on an output of the acceleration transducer.

5. A method as set forth in claim 1, wherein a value of the predetermined threshold is adaptively varied by one of the mobile station or a base station.

6. A method as set forth in claim 1, wherein at least one of the steps of detecting further considers at least one of a measured bit error rate or a measured word error rate.

7. A method of reducing the power consumption of a mobile station when operating in an idle mode, comprising the steps of:

detecting, with the mobile station, a fulfillment of at least one first predetermined criterion when operating in the idle mode;

in response to the detection of the fulfillment of the at least one first predetermined criterion, entering a power saving mode that operates by reducing a use of a receiver of the mobile station to receive signals from one or more cells that border a cell that currently serves the mobile station;

detecting, with the mobile station, a fulfillment of at least one second predetermined criterion when operating in the power saving mode; and in response to the detection of the fulfillment of the at least one second predetermined criterion, exiting the power saving mode; wherein the at least one first predetermined criterion is comprised of an occurrence of a detection by the mobile station that a cell serving the mobile station is a predetermined cell.

8. A method as set forth in claim 7, wherein the at least one first or second predetermined criterion is a presence of an input command entered by a user.

9. A method as set forth in claim 7, wherein the at least one second predetermined criterion is an occurrence of the mobile station exiting a cell wherein the power saving mode was activated.

10. A method as set forth in claim 7, wherein the at least one second predetermined criterion is an occurrence of a timeout condition indicated by a timer means.

11. A method as set forth in claim 7, wherein the at least one second predetermined criterion is an occurrence of a condition wherein a RSSI level of the serving cell decreases by some predetermined amount.

12. A method as set forth in claim 7, wherein the at least one first predetermined criterion is an occurrence of an expiration of a predetermined period of time after a cell reselection operation has been performed.

13. A method as set forth in claim 7, wherein the at least one first predetermined criterion is an occurrence of a first predetermined time of day, and wherein the at least one second predetermined criterion is an occurrence of a second predetermined time of day.

14. A method for operating a wireless mobile station in a standby mode to conserve battery power, comprising the steps of:

initiating a neighboring cell search task; and subsequently operating a controller of the mobile station to execute the following steps, receiving a paging block;

calculating a motion indicator based at least in part on measured received signal strength indicator (RSSI) levels, including RSSI levels measured from neighboring cells;

comparing the motion indicator to a threshold value;

in accordance with a result of the step of comparing the motion indicator to the threshold value, performing one of continuing to make RSSI measurements of neighboring cells or terminating the making of RSSI measurements of neighboring cells, where an amount of RSSI measurements is a number of neighboring cell signal level samples per paging block reception, where the neighboring cell search task searches for adjacent cells from which cell synchronization data has not been received, and where refreshing procedures are periodically performed to receive cell synchronization data from neighboring cells from which cell synchronization data was previously received.

* * * * *